US005313961A

United States Patent [19]

McKee

[11] Patent Number: 5,313,961

[45] Date of Patent: May 24, 1994

[54] MOVABLE MEDICAL EXAMINATION CHAIR

[76] Inventor: William B. McKee, 11324 Hubbell, Livonia, Mich. 48150

[21] Appl. No.: 856,537

[22] Filed: Mar. 24, 1992

[51] Int. Cl.[5] .............................................. F16M 13/00

[52] U.S. Cl. .................................... 128/897; 180/65.5; 248/430; 297/344.1

[58] Field of Search ........................ 128/376, 377, 378; 414/921; 248/430, 647; 297/344, 330; 280/209, 206, 220

[56] References Cited

U.S. PATENT DOCUMENTS 1,693,120 11/1928 Rhyner ................................ 297/344
1,759,922 5/1930 Templeton ........................... 248/430
1,962,789 6/1934 Simpson et al. .................... 248/430
3,023,825 3/1962 Rabjohn ......................... 180/65.5 X
3,486,728 12/1969 Naughton ....................... 297/344 X
4,805,710 2/1989 Jarl ................................. 180/65.5 X
4,889,379 12/1989 Aso ................................ 248/430 X
4,936,535 6/1990 Johansson ........................... 248/430
5,083,625 1/1992 Bleicher ......................... 180/65.5 X

*Primary Examiner*—Peter A. Aschenbrenner
*Attorney, Agent, or Firm*—Dykema Gossett

[57] ABSTRACT

A movable base support for a medical examination chair permits movement of the examination chair to provide a space allowing a wheelchair to be positioned adjacent medical instruments. The base support for the examination includes a power unit pivotally mounted to a rear of the platform and biased towards the floor. The bias force ensures that the power unit maintains contact with uneven floor surfaces. A guide system assembly limits the range of movement, and allows the examination chair to be returned to a precise original location adjacent to medical instruments.

12 Claims, 2 Drawing Sheets

MOVABLE MEDICAL EXAMINATION CHAIR

BACKGROUND OF THE INVENTION

This application relates to a movable medical examination chair mounted adjacent to fixed treatment equipment.

Several types of medical treatments utilize equipment mounted at a fixed location relative to an examination chair. An ophthalmologist, as an example, must use an array of sensitive instruments which are located in a fixed position. Under usual circumstances, an examination chair is located in a fixed location adjacent to the medical instruments. The prior art does not allow the examination chair to be moved away from the fixed medical instruments.

When undergoing an eye examination with the above-described equipment, a handicapped person must be physically moved from a wheelchair and manually lifted into the examination chair. The process of moving the handicapped person to the examination chair can be both uncomfortable to the handicapped person, and difficult for the medical personnel who must do the lifting.

SUMMARY OF THE INVENTION

In a disclosed embodiment of the present invention, an examination chair is selectively movable between a treating position, where it is mounted adjacent to fixed medical instruments, to a non-medical instruments. A wheelchair may then be moved into the space occupied by the examination chair when in the treatment position such that an occupant in a wheelchair may be treated by the fixed medical instruments.

In a preferred embodiment of the present invention, the examination chair is mounted on a movable base, and a power drive unit is pivotally attached to the movable base. The power drive unit is mounted on wheels, which are driven by a motor. Further, the power drive unit is preferably biased downwardly onto the floor such that the wheels engage the floor surface, even if the floor surface is uneven.

In further features of the present invention, the platform preferably consists of wheels which support the platform, and edge walls which define the lateral periphery of the platform. A support member is positioned at a lower end of the platform, with the edge walls extending upwardly from that support member. Top cover portions extend laterally inwardly from the edge walls. In a preferred embodiment of the present invention, the top cover portions enclose a lower portion of the examination chair.

These and other features of the present invention can be best understood from the following specification and drawings, of which the following is a brief description.

DETAILED DESCRIPTION OF A PREFERRED EMBODIMENT

Figure 1:
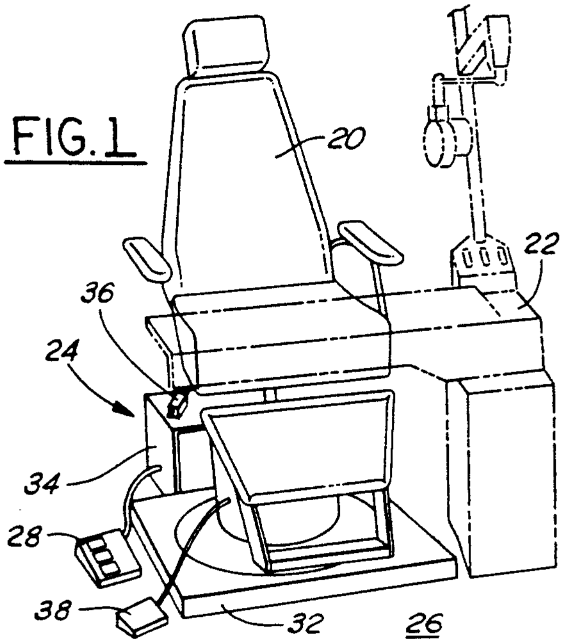
FIG. 1 is a perspective view of an inventive movable examination chair.

Referring to the drawings, FIG. 1 shows an examination chair 20 in a normal treatment position mounted adjacent medical instruments 22 for treatment of a patient. The medical instruments 22 are located in a fixed position adjacent to the examination chair 20, and may be pivoted to extend in front of examination chair 22. Examination chair 20 is mounted on a movable base 24. A first foot control pad 28 is used to vertically adjust the examination chair to accommodate an individual patient undergoing examination.

Figure 1A:
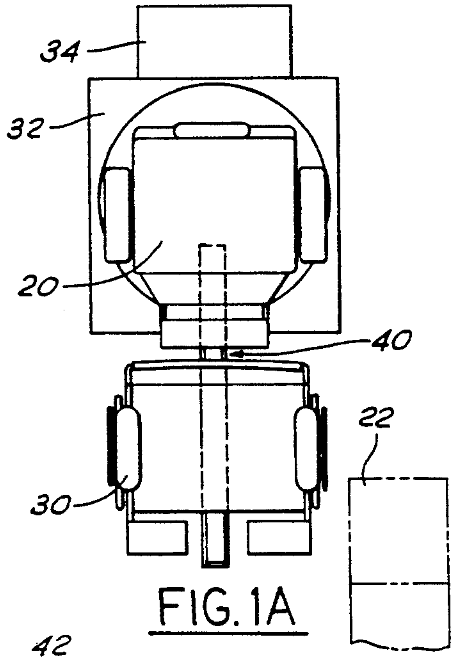
FIG. 1A is a schematic top view illustrating the use of the inventive movable examination chair.

In the event that a handicapped person must undergo an examination, examination chair 20 may be moved rearwardly on movable base system 24 to a non-treatment position to allow access for a wheelchair 30, as shown in FIG. 1A. The examination chair 20 rests on a platform 32 which is moved by a power drive unit 34. Controls for power drive unit 34 may include activation button 36 mounted on the back of the examination chair, which is preferably used in conjunction with second foot control pad 38 to move examination chair 20. Alternatively, only a single control member need be used.

As shown in FIG. 1A the examination chair 20 is moved rearwardly to accommodate wheelchair 30 which occupies the original position of the examination chair 20, adjacent medical instruments 22. The examination chair 20 is mounted on movable platform 32 which is guided on track 40. Wheelchair 30 preferably straddles track 40.

Figure 2:
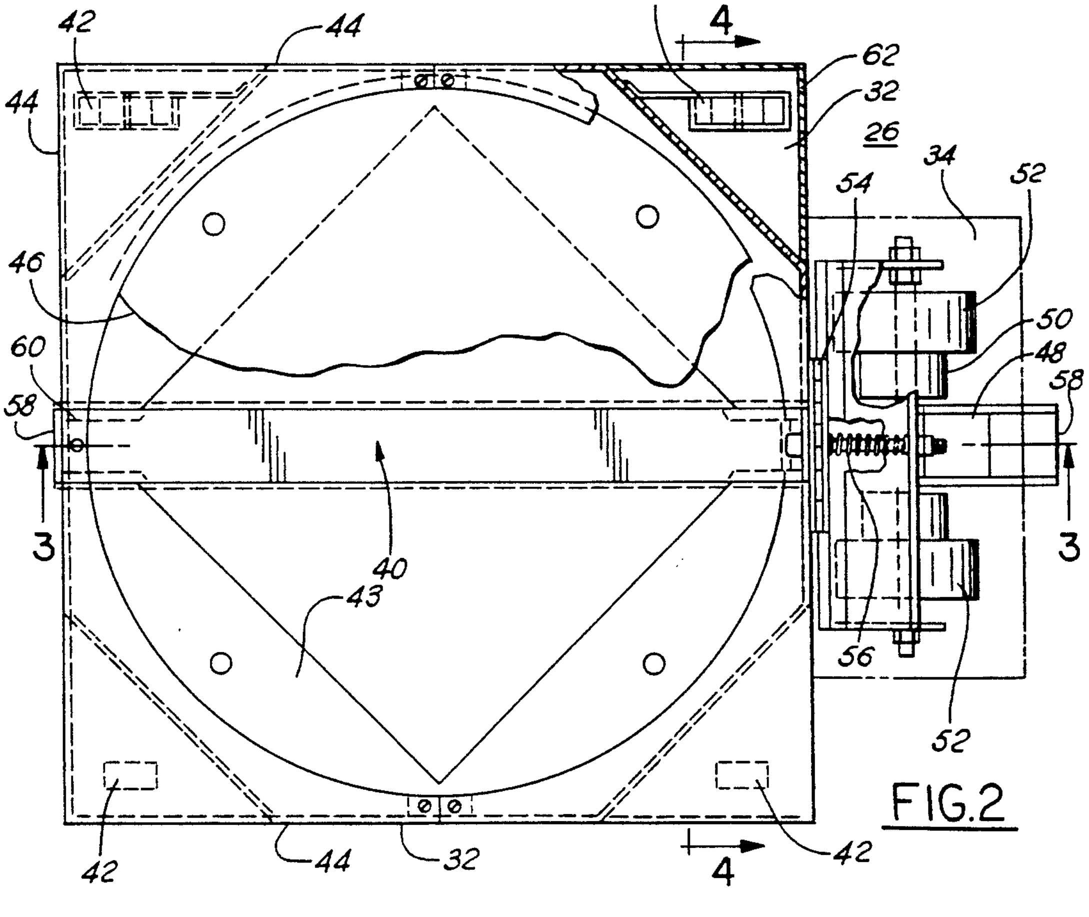
FIG. 2 is a top view, partially in cross-section, of a portion of the movable examination chair.

As shown in FIG. 2, platform 32 is rectangular, having a lower support member 43 and four lateral edge walls 44 extending upwardly from lower support member 43. Platform 32 is preferably constructed of a rigid material designed to accommodate chair 20, which may weigh 350 pounds, in addition to a patient. Platform 32 is supported off the floor by wheels 42 located at each corner. A top cover 46 extends from edge walls 44 inwardly and generally parallel to lower support member 43. Top cover 46 encloses a lower portion of examination chair 20. The platform 32 is moved by a power drive unit 34 attached to the rear of platform 32. The power drive unit 34 has an electric motor 48 rotating axle 50 with wheels 52 mounted at opposed ends. Power drive unit 34 is pivotally mounted by a hinge 54 on a lower portion of the platform 32, and is biased towards the floor 26. Power drive unit 34 may be biased solely by gravity, or may be forced outwardly and downwardly by a spring 56 located on an upper portion of the platform 32.

A vertical platform plate 62 mounted at the rear of platform 32 provides a surface for mounting power drive unit 34. Hinge 54 secures power drive plate 64 to a lower portion of platform plate 62. Spring 56 is mounted on an upper portion of platform plate 62, and forces power drive plate 64 outwardly and downwardly towards floor 26. The movement of movable base 24 is limited and controlled by track 40, which includes floor track 58 secured to floor 26 and guide track 60 secured to platform 32.

Figure 3:
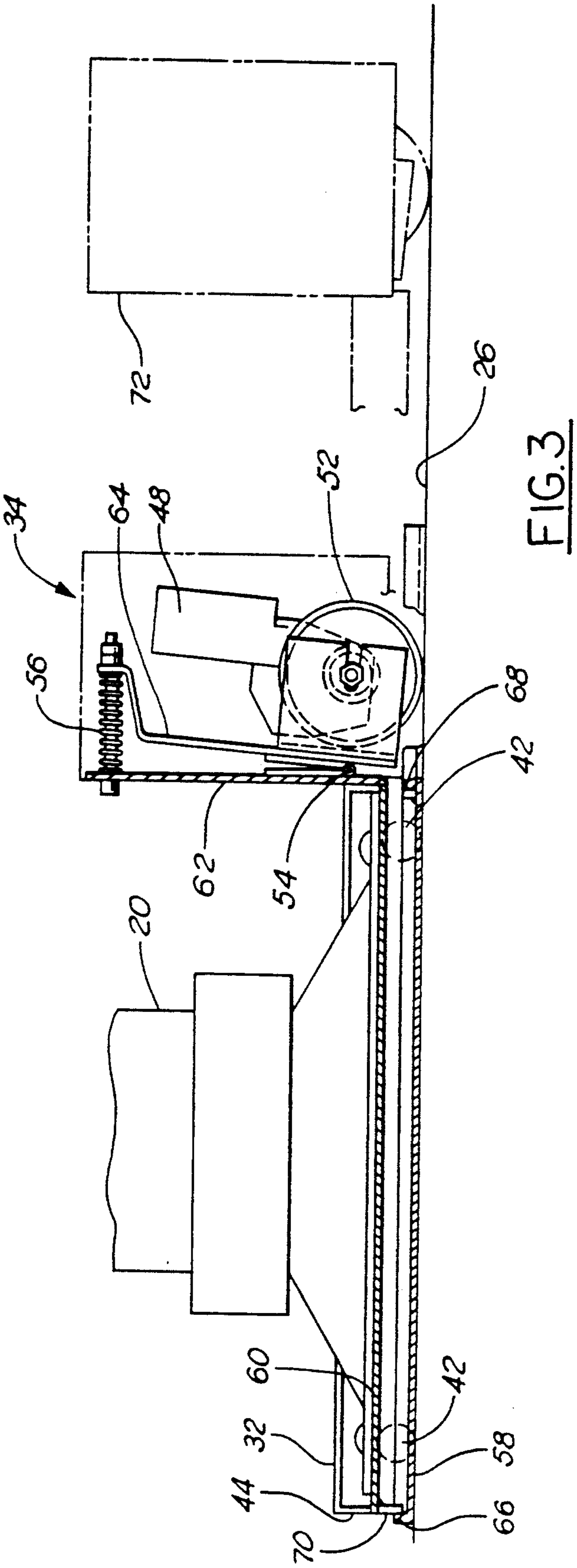
FIG. 3 is a cross-sectional view along line 3—3 as shown in FIG. 2.

As shown in FIG. 3, the range of movement of the movable base 24 is limited by stops 66 and 68 which extend upwardly from floor track 58. A tab 70 extends downwardly from guide track 60 towards floor 26 and alternatively contacts stops 66 and 68, preventing further movement. The placement of stops 66 and 68 determine the range of movement along the longitudinal axis for movable base 24. The phantom lines show the movable base 24 moved to a non-treatment position 72. Further extension of the movable base 24 is prevented as tab 70 encounters stop 68. The rear stop 68 ensures that examination chair 22 is removed rearwardly enough that there is room for a wheelchair. Stop 66 ensures that examination chair 22 is properly positioned relative to the medical instruments.

Figure 4:
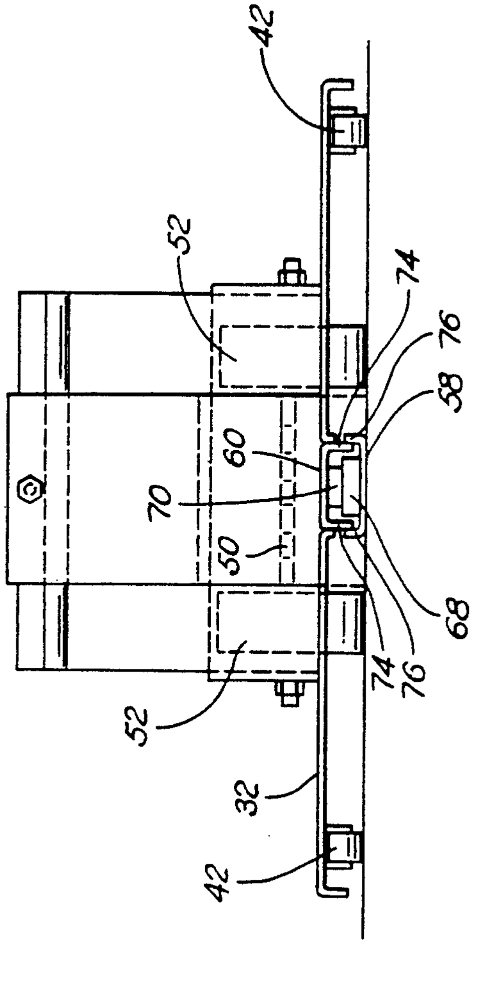
FIG. 4 is a cross-sectional view along line 4—4 as shown in FIG. 2.

As shown in FIG. 4, tab 70 extends downwardly with respect to the floor and into floor track 58 where it may encounter stop 68. The guide track 60 is generally U-shaped with two laterally spaced flanges 76. The floor track 58 is also generally U-shaped with two laterally spaced flanges 74 positioned outwardly of flanges 76. With the flanges 76 of floor track 58 positioned in this manner, lubricant may be added to the floor track 58 to facilitate movement of the floor track 58 relative to the guide track 60.

A preferred embodiment of the present invention has been disclosed, however, a worker of ordinary skill in the art would realize that certain modifications of this invention would be obvious from the teachings of this application. Thus, the following claims should be studied in order to determine the true scope and content of the invention.

I claim:

1. A movable base for supporting a patient examination chair comprising:

a first member for supporting an examination chair including a platform and a plurality of first member wheels supporting said platform;

a guide track carried by said first member, said guide track being generally U-shaped with two laterally spaced guide flanges, said guide flanges extending downwardly with respect to said floor; and a floor track adapted to be rigidly mounted to a floor, said guide track being slidingly received on said floor track to control movement of said first member, said floor track being generally U-shaped with two laterally spaced floor flanges, said floor flanges extending upwardly with respect to said floor, one of said floor and guide flanges being received laterally outwardly of the other.

2. A movable base as recited in claim 1, wherein said second member includes a motor for driving said second member wheel.

3. A movable base as recited in claim 2, wherein said second member wheel includes at least two wheels mounted to an axle rotated by said motor.

4. A movable base as recited in claim 1, wherein said first member includes edge walls at its periphery, and a top cover extending generally parallel to said platform attached to upper portions of said edge walls, said top cover extending inwardly with respect to said edge walls to enclose a lower portion of an examination chair.

5. A movable base as recited in claim 1, wherein said floor track includes stops extending upwardly with respect to said floor, and said guide track having a tab extending downwardly into said floor track such that when said tab encounters said stops movement of said first member is limited.

6. A method for providing space for a wheelchair adjacent fixed medical instruments comprising the steps of:

(1) locating a pre-determined first location for a patient examination chair, said first location being adjacent to fixed medical instruments;

(2) locating a pre-determined second location for said patient examination chair, said second location being spaced from said first location in a direction away from said fixed medical instruments a distance sufficient to allow for placement of a wheelchair between said fixed medical instruments and said patient examination chair;

(3) providing said patient examination chair with a movement means, for moving said patient examination chair, said movement means further being adapted to lock said patient examination chair at said first or second location;

(4) providing said patient examination chair with a guiding means, for guided movement of said patient examination chair between said first location and said second location;

(5) providing said guiding means with an indicator at said first location to assist in returning said patient examination chair to said first location;

(6) selectively moving said patient examination chair from said first location to said second location;

(7) moving said wheelchair to a treatment location adjacent said first location when said patient examination chair is at said second location;

(8) treating a patient in said wheelchair with said fixed medical instruments;

(9) moving said wheelchair from said treatment location; and

(10) selectively moving said patient examination chair from said second location to said first location, the movement ceasing at said indicator provided at said first location.

7. A medical treatment assembly comprising:

medical treatment instruments mounted at a first location;

an examination chair, movable between a treatment position adjacent to said first location, and a non-treatment position removed from said first location by a distance sufficient such that said medical chair may be moved to said non-treatment position to provide access for a wheelchair to be placed in the position previously occupied by said examination chair in said treatment position;

a floor track fixed to a floor; and a guide track movable with said examination chair, said guide track being slidably received on said floor track, such that said guide track and said floor track guide movement of said examination chair between said treatment and non-treatment positions, and assure that said examination chair is properly positioned relative to said first location when said chair is in said treatment position, said floor track being generally U-shaped with two floor flanges laterally spaced and extending vertically upwardly from said floor, and said guide track being generally U-shaped with two guide flanges laterally spaced and extending downwardly towards said floor, one of said floor and guide flanges being received laterally outwardly of the other to provide said slidable support.

8. The system as recited in claim 7, wherein said examination chair is mounted on a movable base, said movable base having a first member for supporting said examination chair, and a second member pivotally attached to said first member, and providing a drive for selectively moving said first member, said first member having a plurality of first member wheels supporting said platform, said second member including at least one second member wheel, and said second member wheel being biased downwardly onto a floor surface.

9. A system as recited in claim 8, wherein said second member comprises a motor for driving said second member wheel.

10. A system as recited in claim 9, wherein said second member wheel includes at least two wheels mounted to an axle which is rotated by said motor.

11. A system as recited in claim 7, wherein said floor track including stops extending upwardly with respect to said floor, and said guide track having a tab extending downwardly into said floor track, such that said tab encounters said stops to limit the movement of said examination chair relative to said floor track.

12. A movable base as recited in claim 1, wherein said movable base further includes a second member pivotally attached to said first member and providing a drive means for selectively moving said first member, said second member including at least one second member wheel and said second member wheel being independently biased from said first member downwardly towards the floor.

* * * * *

UNITED STATES PATENT AND TRADEMARK OFFICE

CERTIFICATE OF CORRECTION

PATENT NO. : 5,313,961

DATED : May 24, 1994

INVENTOR(S) : William B. McKee

It is certified that error appears in the above-indentified patent and that said Letters Patent is hereby corrected as shown below:

Column 6, line 13, please insert:

13. A movable base as recited in claim 12, wherein said second member wheel is biased into contact with the floor.

Signed and Sealed this

Twenty-first Day of February, 1995

Attest:

BRUCE LEHMAN

*Attesting Officer*

*Commissioner of Patents and Trademarks*